US006906621B2

(12) United States Patent
Kore (10) Patent No.: US 6,906,621 B2
(45) Date of Patent: Jun. 14, 2005

(54) OCCUPANT PROTECTION SYSTEM FOR VEHICLE (75) Inventor: Haruhisa Kore, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 53 days.

(21) Appl. No.: 10/060,400

(22) Filed: Feb. 1, 2002

(65) Prior Publication Data

US 2002/0105416 A1 Aug. 8, 2002

(30) Foreign Application Priority Data

Feb. 6, 2001 (JP) .......................................... 2001-029771
Feb. 8, 2001 (JP) .......................................... 2001-032546

(51) Int. Cl.[7] ................................................ B60Q 1/00
(52) U.S. Cl. ........................................ 340/436; 340/435
(58) Field of Search ............................... 340/903, 435, 340/436, 438; 701/45; 180/271, 274, 281; 280/806, 807, 735; 297/478, 480

(56) References Cited

U.S. PATENT DOCUMENTS 4,072,945 A * 2/1978 Katsumata et al.
6,088,640 A * 7/2000 Breed ............................ 701/45
6,213,512 B1 * 4/2001 Swann et al. ................ 280/806
6,278,360 B1 * 8/2001 Yanagi ........................ 340/436
6,370,461 B1 * 4/2002 Pierce et al. .................. 701/45
6,374,168 B1 * 4/2002 Fujii ............................ 701/45
6,385,517 B1 * 5/2002 Kore ............................ 701/45
6,394,495 B1 * 5/2002 Specht ....................... 280/806
6,553,130 B1 * 4/2003 Lemelson et al. .......... 382/104
6,609,066 B2 * 8/2003 Miller et al. ................ 701/301

FOREIGN PATENT DOCUMENTS

JP    09-175327 A    7/1997

* cited by examiner

Primary Examiner—Brent A. Swarthout
(74) Attorney, Agent, or Firm—Donald R. Studebaker; Nixon Peabody, LLP (57) ABSTRACT An occupant protection system of the type of predicted rear-end collision adaptive control raises an alarm when a rear-end collision is predicted and activates a belt tensioning motor to strain a safety belt so as to restrain the occupant strongly against the back of a seat at a point of time specified seconds before a possible occurrence of the predicted rear-end collision. In specific running situations such as cornering a sharp bent lane and making a right or left turn where the occupant protection system possibly confuses a stationary traffic device with a following vehicle, the occupant protection system is prevented from raising an alarm of a possible rear-end collision and straining the safety belt.

8 Claims, 8 Drawing Sheets

OCCUPANT PROTECTION SYSTEM FOR VEHICLE

BACKGROUND OF THE INVENTION

1. Field of the Invention

The present invention relates to an occupant protection system for a vehicle, and, more particularly, to a collision adaptive occupant protection system for a vehicle that strains a seat belt so as thereby to restrain the occupant's body tightly against the back of a seat.

2. Description of Related Art

In order to protect occupants of a vehicle from injuries upon an occurrence of a collision of the vehicle, a seat is equipped with a seat belt that restrains an occupant body against the back of the seat. There are different types of collisions, namely a front-end collision that a vehicle runs into an obstacle such as a vehicle ahead and a rear-end collision that a vehicle is run into from behind. The rear-end collision is hardly predictable for occupants, in particular a driver, of the vehicle who sit facing the front. Therefore, there have been proposed various collision adaptive seat belt systems that can strongly strain the seat belt instantaneously when a rear-end collision is predicted so as thereby to restrain the occupant's body tightly against the back of the seat. Such a collision adaptive seat belt system is constructed so as to predict an occurrence of a rear-end collision of the vehicle with a following vehicle approaching the vehicle from the rear on the basis of a space distance between the vehicle and the following vehicle or a relative speed between the two vehicles that is detected by a monitor such as radar.

One of the collision adaptive seat beat systems described in, for example, Japanese Unexamined Patent Application No. 9-175327 performs rear-end collision prediction on the basis of a space distance between a vehicle and a following vehicle approaching the vehicle from the rear that is detected by a monitor and predetermined upper and lower critical allowable times before a crash. When an allowable time before a crash that is calculated on the basis of the space distance is between the upper and lower critical allowable times, it is judged that a rear-end collision is within the range of possibility, then, the seat belt is comparatively strongly strained as a warning of a crash provided for the occupant. Further, when the allowable time exceeds the lower critical allowable time, it is predicted that a rear-end collision will occurs, then, the seat belt is strongly strained so as thereby to tightly restrain the occupant's body against the back of the seat for preparation for a crash.

The prior art collision adaptive seat belt system possibly raises a false alarm of a predicted collision although no one is tailgating the vehicle. The false alarm is conceivable to be raised resulting from that the monitor confuses rear stationary traffic devices such as protective wall panel and guard rail with a vehicle approaching from the rear. More specifically, in order for the seat belt system to raise an alarm of a collision and to strain the seat belt to put the occupant prepared for a crash, it is conventional to provide the vehicle with a monitor such as distance sensor that emits a detecting wave behind the vehicle and receives an echo from a following vehicle so as to detect a space distance to the following vehicle on the basis of the echo. When making a turn in a sharp bent lane or making a left or right turn at an intersection, it is so often that the vehicle changes its position so as to gradually decrease a distance to a stationary protective wall panel or a guard rail as a rear stationary traffic device in an aiming direction of the distance sensor. As a result, the collision adaptive seat beat system misidentifies the protective wall panel or the guard rail as a vehicle gradually approaching from the rear.

In order to avoid a misidentification of the rear stationary traffic device as a following vehicle approaching the vehicle from the rear, it is conceivably effective to enable the collision adaptive seat beat system to distinguish a rear stationary traffic device from a vehicle. However, it is quite hard to distinguish the rear stationary traffic device from a vehicle. Discrimination between these two objects thrusts imaging a rear field behind the vehicle and processing the image onto the collision adaptive seat beat system. This levies a high cost on the collision predictable seat beat system.

SUMMARY OF THE INVENTION

It is an object of the present invention to provide a collision adaptive occupant protection system that predicts a possible occurrence of a rear-end collision with a following vehicle approaching from the rear without performing discrimination between a following vehicle and a rear stationary traffic device such as pedestrian protection wall panel and pedestrian protection guard rail and strains a seat belt so as to restrain an occupant's body against the seat back of a seat for preparation for a crash when predicting a possible occurrence of a rear-end collision.

It is another object of the present invention to provide a collision adaptive occupant protection system that is prevented from arising a false alarm and subsequently putting an occupant prepared for a crash due to a confusion of a rear stationary traffic device with a vehicle.

The foregoing objects of the present invention are achieved by a collision adaptive occupant protection system having a seat equipped with a seat belt system for a vehicle that comprises collision prediction means for predicting a possible occurrence of a rear-end collision of the vehicle with a following vehicle approaching from the rear and collision adaptive control means for straining the seat belt so as thereby to restrain the occupant's body tightly against the back of the seat when the collision prediction means predicts an occurrence of a rear-end collision.

According to an aspect of the present invention, the collision adaptive occupant protection system includes inhibition means for preventing the collision adaptive control means from operating when a vehicle speed and a steering angle are greater than specified speed and angle, respectively. The collision adaptive occupant protection system can avoid a confusion of a rear stationary traffic device such as guard rail with a following vehicle approaching from the rear by distinguishing between the stationary traffic device and the vehicle simply on the basis of a vehicle speed and a steering angle of the vehicle, so as to prevent the collision adaptive control of the seat belt system from being performed due to the confusion of the rear stationary traffic device with a vehicle. One of specific conditions for inhibition of the collision adaptive control is a vehicle speed greater than a specified speed, so that the collision adaptive occupant protection system securely puts the occupant prepared for a crash in an event, for example, where if the vehicle is stopped (a vehicle speed is zero) at an intersection following greatly turning the steering wheel to the left or right and another vehicle approaches from the rear. The specific condition may be a head distance of an occupant's head to a head restraint of the seat. This is more desirable to protect the occupant from injuries upon an occurrence of a rear-end collision.

The collision prediction means may raise an alarm of a predicted possible rear-end collision. In this case, the inhibition means further prevents the collision prediction means from raising an alarm when a vehicle speed and a steering angle are greater than a specified vehicle speed and a specified steering angle, respectively. This avoids a false alarm due to the confusion of a rear stationary traffic device with a vehicle.

The collision adaptive control means may change a straining time for which the collision adaptive control means strains the seat belt, i.e. the seat belt system strongly restrains the occupant's body tightly against the back of the seat for preparation for a crash, longer when the vehicle speed is less than near zero than when the vehicle speed is greater than nearly zero. This realizes reliable protection of the occupant from injuries upon an occurrence of a rear-end collision and high drivability of the vehicle after the rear-end collision if actually occurs. The long straining time is desirable to tightly restrain the occupant's body against the back of the seat for a long time in order to protect the occupant from injuries if a rear-end collision actually occurs. Further, the short straining time allows the occupant to be prepared for driving operations that should be taken after a crash.

According to another aspect of the present invention, the collision prediction means predicts, in addition to prediction of an occurrence of a rear-end collision of the vehicle with a following vehicle approaching from the rear, a possible rear-end collision as well on the basis of a threshold value attributive to the vehicle relative to the following vehicle variable according to a specific condition such as a braking distance that the following vehicle travels before a halt if the following vehicle slows down at a specified deceleration. The variable threshold value provides an alarm that is raised at an appropriate timing according to a probability level of an occurrence of a rear-end collision. The alarm is raised on the assumption that the following vehicle slows down in order to avoid running into the vehicle ahead.

BRIEF DESCRIPTION OF THE DRAWINGS

The above and other objects and features of the present invention will be clearly understood from the following detailed description when read with reference to the accompanying drawings, wherein the same numeral numbers have been used to denote same or similar parts or mechanisms throughout the drawings and in which.

DETAILED DESCRIPTION OF THE PREFERRED EMBODIMENTS

Figure 1:
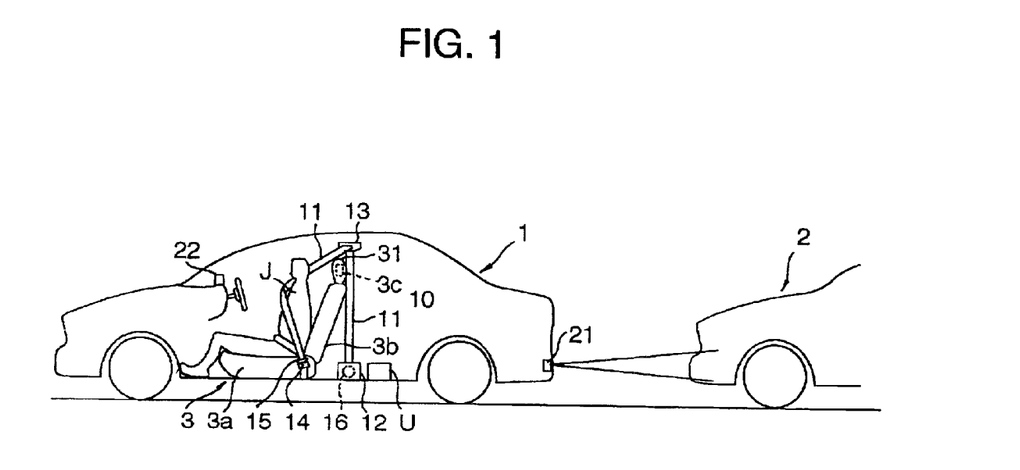
FIG. 1 is a schematic side view of a vehicle equipped with a collision adaptive occupant protection system.

Referring to the drawings in detail, and, in particular, to FIG. 1 showing a vehicle 1 equipped with a collision adaptive occupant protection system in accordance with an embodiment of the present invention, the vehicle 1 is provided with a seat 3 comprising a seat cushion 3a, a seat back 3b and a head restraint 3c. The seat 3 is provided with a safety belt system 10, such as conventional three-point safety belt system, for restraining a driver or front passenger J as an occupant of the seat 3. The safety belt system 10 comprises a pretensioning unit 12 secured to the floor of the vehicle 1, an anchor 13, a safety belt 11 (which comprises a seat belt part and a shoulder harness part), a buckle 14 and a tang 15 mounted on the safety belt 11 for slide movement. The safety belt 11 that is pulled out from the pretensioning unit 12 extends upward to the anchor 13 and folded downward to a part of the floor on one of opposite side of the seat 3. The buckle 14 is secured to the floor on another side of the seat 3. The occupant engages the tang 15 with the buckle 14 so as to wear the safety belt 11. The safety belt 11 is known in various types including three or four point types and may take any well known type.

The pretensioning unit 12 includes a motor 16 as straining means for straining the safety belt 11. When the motor 16 is activate, the motor 16 forcibly pulls the safety belt 11 into the pretensioning unit 12 to strain the safety belt 11 in a direction indicated by an arrow in FIG. 1, so as thereby to restrain tightly the occupant's body J against the back of the seat 3. While the motor 16 remains activated, the safety belt 11 is strongly stained so as to be prevented from being slackened or pulled out of the pretensioning unit 12 even with strong pulling force. The collision adaptive occupant protection system includes various sensors, namely a distance sensor 21 mounted to a rear end thereof, a speed sensor 23, a steering angle sensor 24 and another distance sensor 31 (see FIG. 2) which are known in various forms and may take any form well known in the art. The distance sensor 21 is such as to emit a detecting wave such as light wave, electric wave and supersonic wave toward a following vehicle 2 tailgating the vehicle 1 and receives an echo from the following vehicle 2 so as to detect a space distance Dc to the following vehicle 2 from the vehicle 1. The speed sensor 23 detects a speed of the vehicle 1. The steering angle sensor 24 detects a steering angle of the wheel. The distance sensor 31 is embedded in, for example, the head restraint 3c so as to detect a distance of an occupant's head from the head restraint 3c. Further, the vehicle 1 is equipped with a control unit U comprising a microcomputer and alarm means 22 such as alarm light and alarm buzzer.

Figure 2:
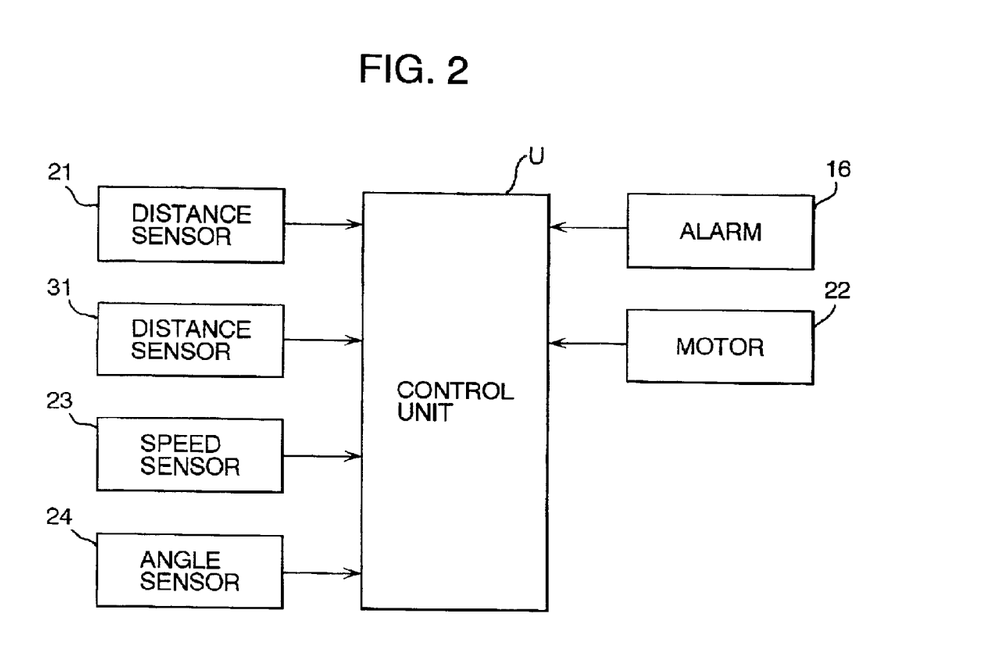
FIG. 2 is a block diagram illustrating a control system of the collision adaptive occupant protection system
Figure 3:
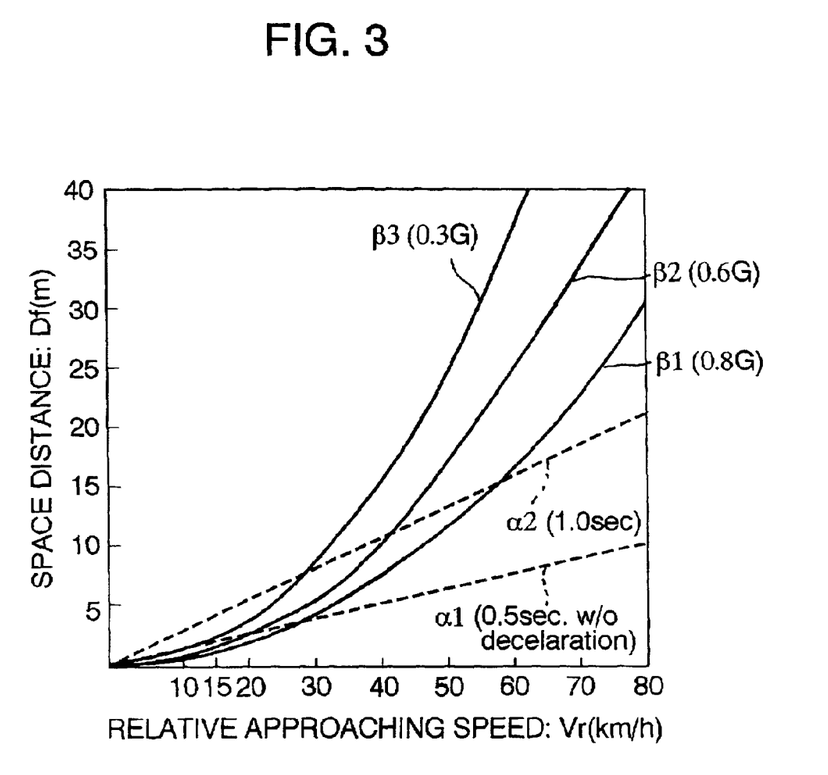
FIG. 3 is a diagram showing hazardous space distance characteristic curves

As shown in FIG. 2, the control unit U receives signals from the distance sensor 21, the speed sensor 23 and the steering angle sensor 24 and performs programmed control adaptive to a predicted rear-end collision and alarm control on the basis of the signals from the various sensors 21, 23 and 24. In the predicted rear-end collision adaptive control, the motor 16 is activated at a fixed point of time, for example 0.5 seconds, before an occurrence of a predicted rear-end collision of the vehicle 1. Further, the alarm means 22 for a possible rear-end collision of the vehicle 1 is activated at a point of time at which a space distance Dc between the two vehicles 1 and 2 reaches a predetermined critical pace distance Df. This critical space distance Df is determined on the basis of space distance characteristic curves that are established with respect to relative approaching speed Vr and space distance Dc as parameters for various running situations as shown in FIG. 3. Specifically, the space distance characteristic curve defines a critical space distance Df for a relative approaching speed Vr at a prediction of a rear-end collision as a distance that the following vehicle 2 runs until the relative approaching speed Vr reaches zero at a point of time at which the predicted ear-end collision is expected to occur if the following vehicle 2 runs with a specified deceleration.

FIG. 3 shows the space distance characteristic curves, that are established with respect to relative approaching speed Vr, for various running situations α1, α2, β1, β2 and β3 (which are hereafter referred to as space distance characteristic curves α1, α2, β1, β2 and β3 for simplicity) and mapped in the control unit U. The space distance characteristic curve α1 defines a hazardous space distance Df between the two vehicles 1 and 2 at a point of time 0.5 second before an occurrence of a predicted rear-end collision in the event where if a relative approaching speed Vr at a prediction of the rear-end collision of the vehicle 1 remains unchanged until the predicted rear-end collision will occur. This time of 0.5 seconds is the shortest safety margin Tx necessary for the safety belt 11 to remain strongly strained by the motor 16 even upon an occurrence of a predicted rear-end collision of the vehicle 1 with the following vehicle 2 and has been established in consideration of an operation time necessary for the motor 16 before the occurrence of the predicted rear-end collision that is, for example, 0.4 seconds, and a cycle with which the control unit U performs the predicted rear-end collision adaptive control (which will be described later) and which is, for example, 0.1 second. For example, as apparent from the FIG. 3, the point of time at which the following vehicle 2 reaches a position at a distance of approximately 10 m from the vehicle 1 (a critical space distance Df) when the two vehicles 1 and 2 are running at a relative approaching speed Vr of 80 km/h is 0.5 seconds before an occurrence of a predicted rear-end. Similarly, the point of time at which the following vehicle 2 reaches a position at a distance of approximately 5 m from the vehicle 1 when the two vehicles 1 and 2 are running at a relative approaching speed Vr of 40 km/h is 0.5 seconds before an occurrence of a predicted rear-end collision. In other words, the motor 16 is activated at a point of time at which a space distance Dc reaches a critical space distance Df given by the space distance characteristic curve α1 according to a relative approaching speed Vr between the two vehicles 1 and 2. The space distance characteristic curve α2, which is shown for the comparison purpose only, defines a critical space distance Df to the vehicle 1 from the following vehicle 2 at a point of time 1.0 second before an occurrence of a predicted rear-end collision in the event where if a relative approaching speed Vr remains unchanged until the occurrence of the predicted rear-end collision.

On the other hand, each of the space distance characteristic curves β1, β2 and β3 defines a hazardous space distance Df (a critical space distance for avoidance of a rear-end collision) with respect to a relative approaching speed Vr at a prediction of the rear-end collision of the vehicle 1 that is necessary to reliably avoid a crash of the vehicle 1 with a following vehicle 2 tailgating the vehicle 1 in the event where the following vehicle 2 slows down with a constant deceleration. Specifically, the space distance characteristic curve β1 defines a hazardous space distance Df for a relative approaching speed Vr when the following vehicle 2 slows down with at a constant deceleration of 0.8 G; the space distance characteristic curve β2 defines a hazardous space distance Df for a relative approaching speed Vr when the following vehicle 2 slows down with a constant deceleration of 0.6 G; and the space distance characteristic curve β3 defines a hazardous space distance Df for a relative approaching speed Vr when the following vehicle 2 slows down with a constant deceleration rate of 0.4 G.

The space distance characteristic curves β1, β2 and β3 are selectively used according to a relative approaching speed Vr at a prediction of a rear-end collision as will be described later. The hazardous space distance Df defined by either one of the space distance characteristic curves β3, β2 and β3 according to a current relative approaching speed Vr is established as a threshold value that is used in a judgment as to a possible rear-end collision. That is, when a current space distance Dc reaches less than the hazardous space distance Df, it is judged that there is a possible rear-end collision, then, the alarm means 22 is activated to raise an alarm.

As apparent from a comparison of the space distance characteristic curve β1, β2 or β3 with the space distance characteristic curve α1, a difference in hazardous space distance Df between the two running situations α1 and β1, β2 or β3 becomes larger as the relative approaching speed Vr becomes higher. That is, the space distance Dc at which the alarm means 22 is activated becomes longer as the relative approaching speed Vr becomes higher (i.e. as the hazardous level becomes higher) and the point of time at which the alarm means 21 is activated becomes earlier as the relative approaching speed Vr becomes higher. This indicates that there is provided a safety margin prepared for raising an alarm. On the other hand, when the relative approaching speed Vr becomes lower than approximately 28 km/h, the hazardous space distance Df defined by the space distance characteristic curve β1 is shorter than that defined by the space distance characteristic curve α1. This indicates that, when the relative approaching speed Vr is lower than 28 km/h, there is provided no safety margin prepared for raising an alarm of a possible rear-end collision if determining the point of time of raising the alarm on the basis of the space distance characteristic curve β1. For this reason, when the relative approaching speed Vr is comparatively lower, more specifically lower than 28 km/h, the space distance characteristic curve β2 is used in place of the space distance characteristic curve β1. Similarly, when the relative approaching speed Vr becomes lower than approximately 22 km/h, the hazardous space distance Df defined by the space distance characteristic curve β2 is shorter than that defined by the space distance characteristic curve α1. This also indicates that, when the relative approaching speed Vr is lower than 22 km/h, there is provided no safety margin prepared for raising an alarm of a possible rear-end collision if determining the point of time of raising an alarm on the basis of the space distance characteristic curve β2. For this reason, the relative approaching speed Vr is lower than 22 km/h, the space distance characteristic curve β3 is used in place of the space distance characteristic curve β2 or β1. In this instance, because impact against the vehicle 1 upon an occurrence of a rear-end collision is very weak when the relative approaching speed Vr is lower than, for example, 15 km/h which is quite low, the control unit U is adapted so as to shirk raising an alarm of the possible rear-end collision when the relative approaching speed Vr is lower than 15 km/h.

Summarizing the above description, the point of time of activating the motor 16 as one step of the predicted rear-end collision adaptive control is a specified point of time, for example 0.5 seconds, before a predicted rear-end collision will possibly occur. This point of time corresponds to a point of time at which a current space distance Dc between the two vehicles 1 and 2 reaches a hazardous space distance Df defined by the space distance characteristic curve α1 according to a current relative approaching speed Vr. The space distance Dc between the two vehicles 1 and 2 at which the alarm means 22 is activated is determined on the basis of the space distance characteristic curve β1 for relative approaching speeds Vr higher than 28 km/h, on the basis of the space distance characteristic curve β2 for relative approaching speeds Vr between 28 km/h and 22 km/h, or on the basis of the space distance characteristic curve β3 for relative approaching speeds Vr lower than 22 km/h, according to a current relative approaching speed Vr.

Figure 4:
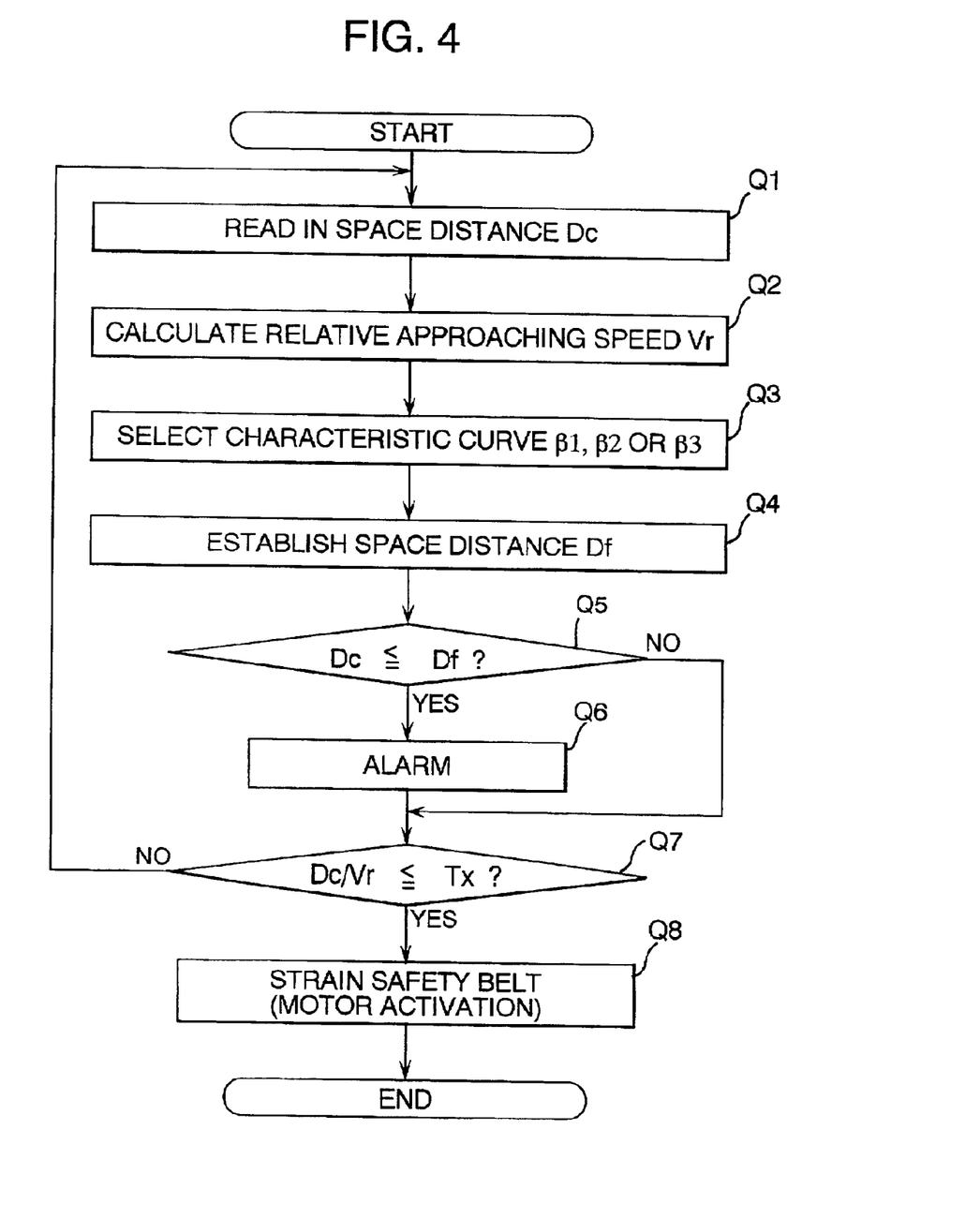
FIG. 4 is a flow chart of a sequence routine of collision adaptive control.

FIG. 4 shows a flow chart illustrating a sequence routine of the predicted rear-end collision adaptive control according to an embodiment of the present invention. When the sequence logic commences and control proceeds to a function block at step Q1 where a space distance Dc between the vehicle 1 and a following vehicle 2 tailgating the vehicle 2 is read in from the distance sensor 21. Subsequently, at step Q2, a relative approaching speed Vr is calculated on the basis of a change of the space distance Dc from the previous space distance Dc. At step Q3, either one of the space distance characteristic curves β1, β2 and β3 is selected on the basis of the relative approaching speed Vr. As was previously described, the space distance characteristic curve β1 is selected when the relative approaching speed Vr is higher than 28 km/h. The space distance characteristic curve β2 is selected when the relative approaching speed Vr is between 28 km/h and 22 km/h. The space distance characteristic curve β3 is selected when the relative approaching speed Vr is lower than 22 km/h.

After establishing a hazardous space distance Df according to the relative approaching speed Vr using the selected space distance characteristic curve β1, β2 or β3 at step Q4, a judgment is made at step Q5 as to whether the space distance Dc has reached the hazardous space distance Df. When the answer is affirmative, the alarm means 22 is activated to raise an alarm of a possible rear-end collision at step Q6. When the answer is negative at step Q5 or after raising an alarm of a possible rear-end collision at step Q6, a judgment is further made at step Q7 as to whether a time left before a possible occurrence of a predicted rear-end collision, which is given by dividing the space distance Dc by the relative approaching speed Vr, is shorter than a specified safety margin Tx, for example 0.5 seconds. When the answer is affirmative, this indicates that that there is no sufficient time before a possible occurrence of a rear-end collision, then, the motor 16 is activated to strain the safety belt 11 strongly so as thereby to restrain the occupant's body against the back of the seat 3 at step Q8. On the other hand, when the answer is negative, this indicates that there is a sufficient time before a possible occurrence of a rear-end collision, then, the sequence logic returns to step Q1 for another sequence routine.

Figure 5:
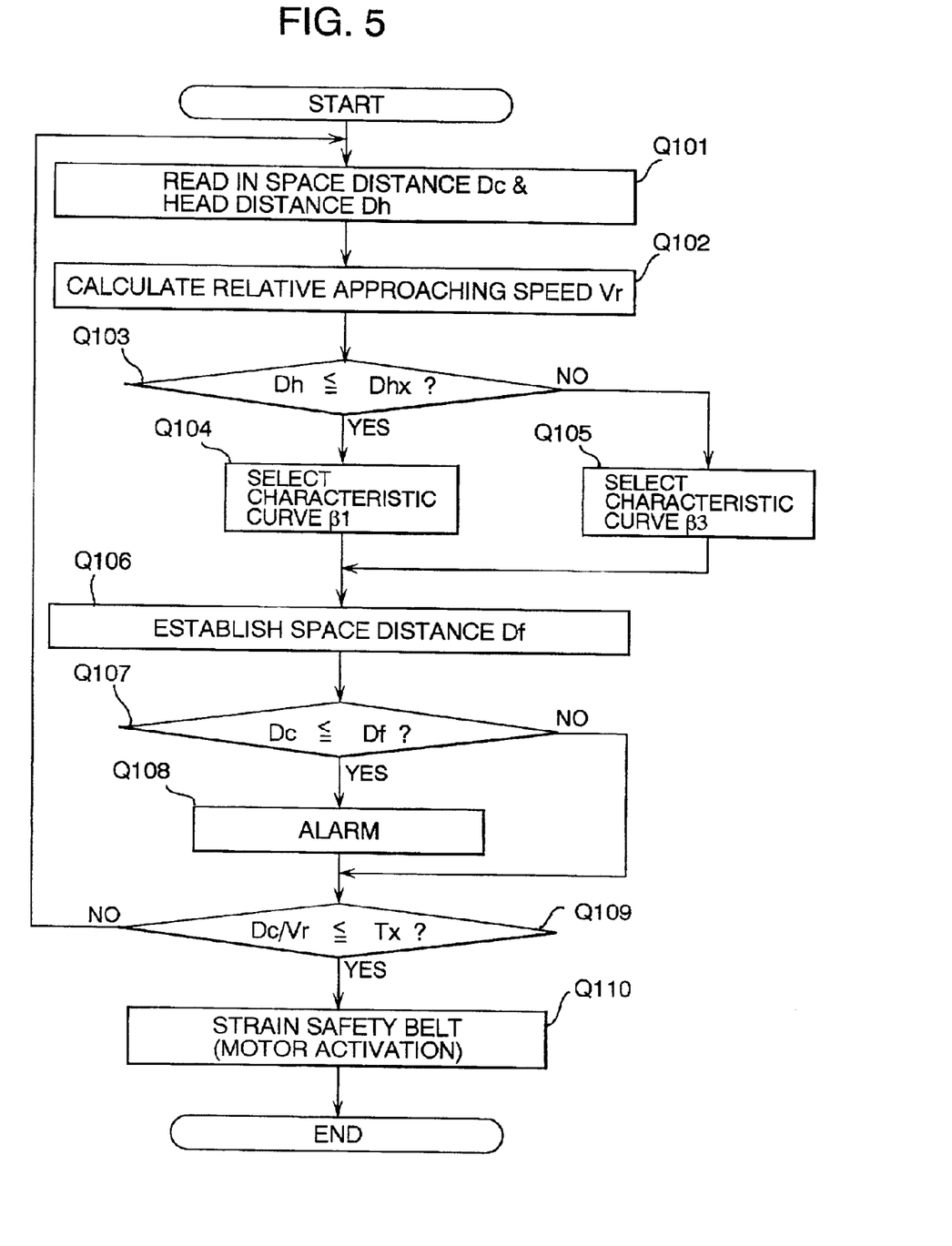
FIG. 5 is a flow chart of a sequence routine of alternative collision adaptive control.

FIG. 5 shows a flow chart illustrating a sequence routine of the predicted rear-end collision adaptive control according to another embodiment of the present invention. In this embodiment, a hazardous space distance Df is variably established according to a space distance Dc and a distance between an occupant's head and the head restraint 3c (a head distance Dh) that is detected by the distance sensor 31 embedded in the head restraint 3c. Specifically, when the head distance Dh of an occupant's head from the head restraint 3c is longer than a critical head distance Dhx of, for example, 100 mm, this indicates that the probability of getting hurt is comparatively higher, then, an alarm is raised earlier by selecting the space distance characteristic curve β3. On 3c the other hand, when the head distance Dh of an occupant's head from the head restraint 3c is shorter than the critical head distance Dhx, this indicates that the probability of getting hurt is comparatively lower, then the space distance characteristic curve β1 is selected.

When the sequence logic commences and control proceeds to a function block at step Q101 where a space distance Dc between the vehicle 1 and a following vehicle 2 tailgating the vehicle 1 and a head distance Dh between an occupant's head and the head restraint 3 are read in from the distance sensors 21 and 31, respectively. At step Q102, a relative approaching speed Vr is calculated on the basis of a change of the space distance Dc from a previous space distance Dc. Subsequently, a judgment is made at step Q103 as to whether the head distance Dh is equal to or shorter than the critical head distance Dhx, for example 100 mm.

When the answer is affirmative, this indicates a higher probability of getting hurt, then, the space distance characteristic curve β1 is selected at step Q104. On the other hand, when the answer is negative, this indicates a lower probability of getting hurt, then, the space distance characteristic curve β3 is selected at step Q105. After selecting the space distance characteristic curve β1 at step Q104 or the space distance characteristic curve β3 at step Q105, a hazardous space distance Df is established according to the relative approaching speed Vr using the selected space distance characteristic curve β1 or β3 at step Q106.

Subsequently, a judgment is made at step Q107 as to whether the space distance Dc has reached the hazardous space distance Df. When the answer is affirmative, the alarm means 22 is activated to raise an alarm of a possible rear-end collision at step Q108. When the answer is negative at step Q107 or after having raising an alarm of a possible rear-end collision at step Q108, a judgment is further made at step Q109 as to whether a time left before a possible occurrence of a predicted rear-end collision, which is given by dividing the space distance Dc by the relative approaching speed Vr, is shorter than a specified safety margin Tx, for example 0.5 seconds. When the answer is affirmative, this indicates that that there is no sufficient time before a possible occurrence of a rear-end collision, then, the motor 16 is activated to strain the safety belt 11 strongly so as thereby to restrain the occupant's body against the back of the seat 3 at step Q110. On the other hand, when the answer is negative, this indicates that there is a sufficient time before a possible occurrence of a rear-end collision, then, the sequence logic returns to step Q101 for another sequence routine.

The following description will be directed to inhibition of the predicted rear-end collision adaptive control in an event where there is a confusion of stationary traffic devices with a following vehicle.

Figure 6:
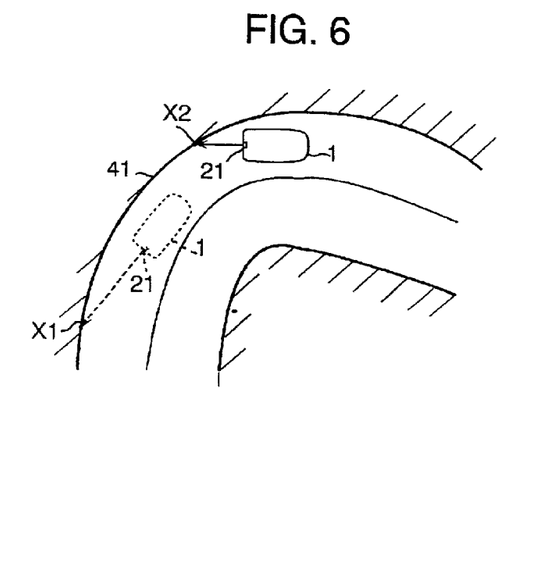
FIG. 6 is an explanatory illustration showing a situation where the collision adaptive occupant protection system confuses a rear traffic device with a vehicle.

FIG. 6 shows a situation where a stationary traffic device behind the vehicle 1 is confused with a following vehicle when the vehicle 1 corners on a sharp bent lane. In the case where the vehicle is not tailgated by any vehicle and changes its position from a position A (a path of the vehicle 1 is at a comparatively small angle with respect to the outer edge of the lane) indicated by a chained line to a position B (a path of the vehicle 1 is at a comparatively large angle with respect to the outer edge of the lane) indicated by a solid line, when there is a stationary traffic device such as pedestrian protection guard rail 41 along an outside shoulder of the driveway, the distance sensor 21 detects the guard rail 41. In this event, a distance to a point X1 on the guard rail 41 that the distance sensor 21 aims is large when the vehicle 1 is in the position A and a distance to a point X2 on the guard rail 41 that the distance sensor 21 aims is small when the vehicle 1 is in the position B That is, as the vehicle 1 corners the sharp bent lane, the vehicle 1 changes its position in a direction in which the distance to the guard rail 41 becomes shorter. This change in position causes the occupant protection system to make a confusion of the guard rail 41 with like a vehicle that tailgating and approaching steeply the vehicle 1.

Figure 7:
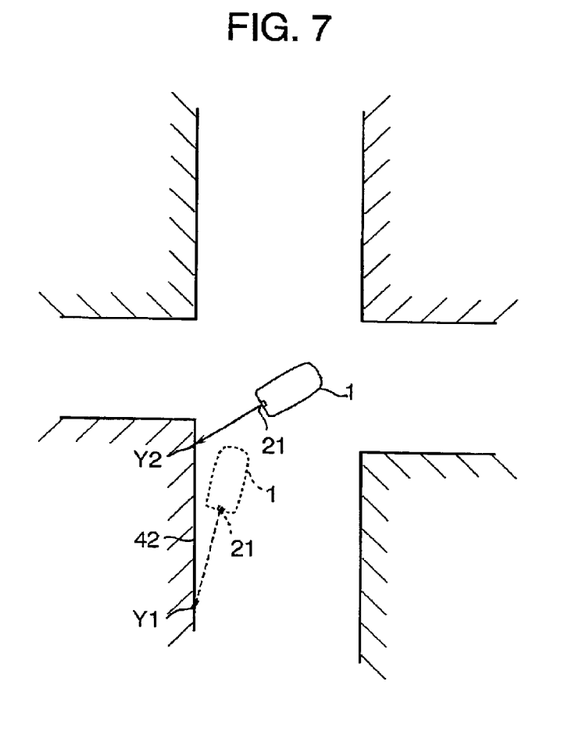
FIG. 7 is an explanatory illustration showing another situation where the collision adaptive occupant protection system confuses a rear traffic device with a vehicle.

FIG. 7 shows a situation where the vehicle changes its position from a position A (a path of the vehicle 1 is at a comparatively small angle with respect to the outer edge of the lane) indicated by a chained line to a position B (a path of the vehicle 1 is at a comparatively large angle with respect to the outer edge of the lane) indicated by a solid line in order to make a right turn at an intersection facilitated with stationary traffic devices such as pedestrian protection walls 42 along sidewalks. In the case where the vehicle 1 is not tailgated by any vehicle, the distance sensor 21 detects the pedestrian protection wall 42. In this event, a distance to a point Y1 on the pedestrian protection wall 42 that the distance sensor 21 aims is large when the vehicle 1 is in the position A and a distance to a point Y2 on the pedestrian protection wall 42 that the distance sensor 21 aims is small when the vehicle 1 is in the position B That is, as the vehicle 1 makes a right turn in the intersection, the vehicle 1 changes its position in a direction in which the distance to the pedestrian protection wall 42 becomes shorter. This change in position causes the occupant protection system to make a confusion of the pedestrian protection wall 42 with like a vehicle that tailgating and approaching steeply the vehicle 1.

Such the confusion caused in the situation as shown in FIG. 6 or 7 occurs when the vehicle 1 makes a right turn with a large steering angle, that is, when the distance sensor 21 shifts its aiming point on the guard rail from the point X1 to the point X2 (FIG. 6) or on the pedestrian protection wall 42 from the point Y1 to the point Y2 (FIG. 7). This shift of the aiming point of the distance sensor 21 occurs due to a presence of speed of the vehicle 1. In light of these circumstances, the predicted rear-end collision adaptive control is inhibited when the vehicle 1 runs with a speed greater than a specified speed and turns with a steering angle greater than a specified angle.

Figure 8:
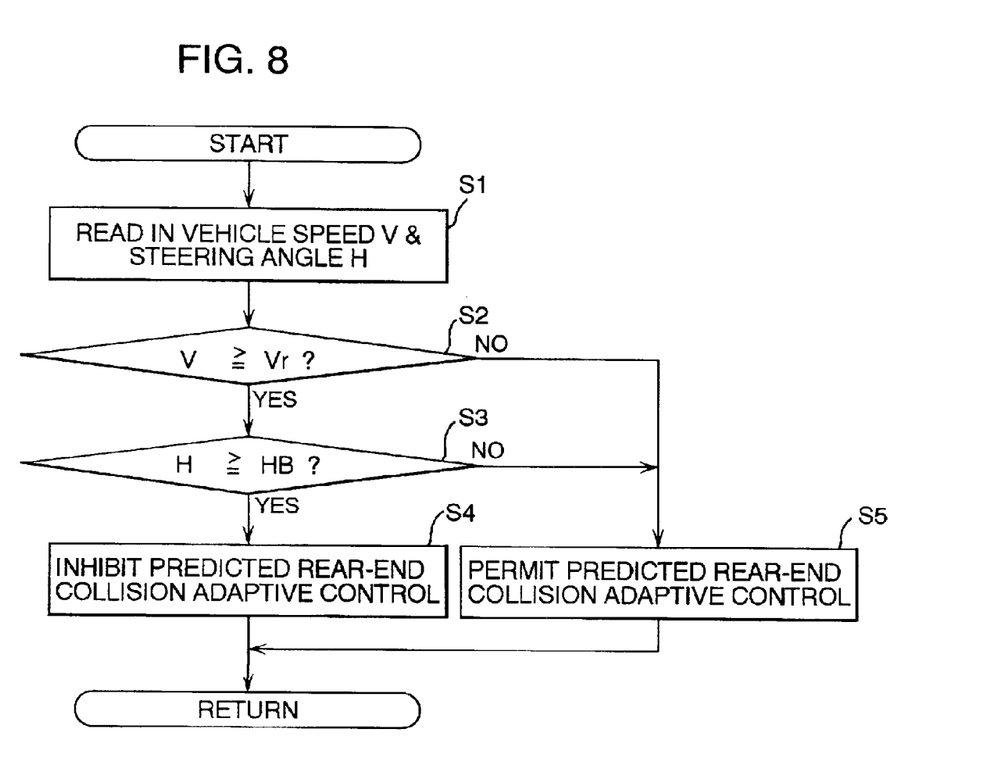
FIG. 8 is a flow chart illustrating a sequence routine of collision adaptive control that is inhibited when there possibly occurs a confusion of a rear stationary traffic device with a vehicle.

FIG. 8 shows a flow chart illustrating a sequence routine of the predicted rear-end collision adaptive control according to another embodiment of the present invention. In this embodiment, the rear-end collision adaptive control such as illustrated by the sequence routine shown in FIG. 4 or 5 is inhibited when there possibly occurs a confusion of a stationary obstacle with a vehicle.

When the sequence logic commences and control proceeds to a function block at step S1 where a vehicle speed V of the vehicle 1 and a steering angle H are read in from the speed sensor 23 and the steering angle sensor 24, respectively. Subsequently, a judgment is made at step S2 as to whether the vehicle speed V greater than a critical vehicle speed VB, for example 5 km/h. When the answer is affirmative, another judgment is made at step S3 as to whether the steering angle H is greater than a critical steering angle HB. When the answers to both judgments made at steps at S2 and S3 is affirmative, this indicates that there possibly occurs a confusion of a stationary obstacle with a vehicle, then, the predicted rear-end collision adaptive control illustrated by the sequence routine shown in FIG. 4 or 5 is inhibited at step S4.

On the other hand, when the answer to either one of the judgments made at steps S2 and S3 is negative, that is, the vehicle speed V is lower than the critical vehicle speed VB or the steering angle H is smaller than the critical steering angle HB even though the vehicle speed V is less than the critical speed VH, these indicate that there is no possibility of a confusion of a stationary obstacle with a vehicle, then, the predicted rear-end collision adaptive control illustrated by the sequence routine shown in FIG. 4 or 5 is called for at step S5.

The inhibition of predicted rear-end collision adaptive control may be incorporated before the judgment as to a space distance Dc made at step Q5 in the sequence routine illustrated by the flow chart shown in FIG. 4 so as to inhibit the subsequent steps Q5 through Q8 when a vehicle speed V is greater than the critical vehicle speed VB (step S2) or before the judgment as to a head distance Dh made at step Q103 in the sequence routine illustrated by the flow chart shown in FIG. 5 so as to inhibit the subsequent steps Q103 through Q110 when a steering angle H is greater than the critical steering angle HB (step S3). Otherwise, the predicted rear-end collision adaptive control through steps S1 to S3 illustrated by the sequence routine shown in FIG. 8 may be incorporated as an interrupt routine in the sequence routine illustrated by the flow chart shown in FIG. 4 or 5. In the interruption routine, an inhibition flag is set up at step S4 so as to inhibit the predicted rear-end collision adaptive control and is reset down at step S5 so as to allow the predicted rear-end collision adaptive control.

Figure 9:
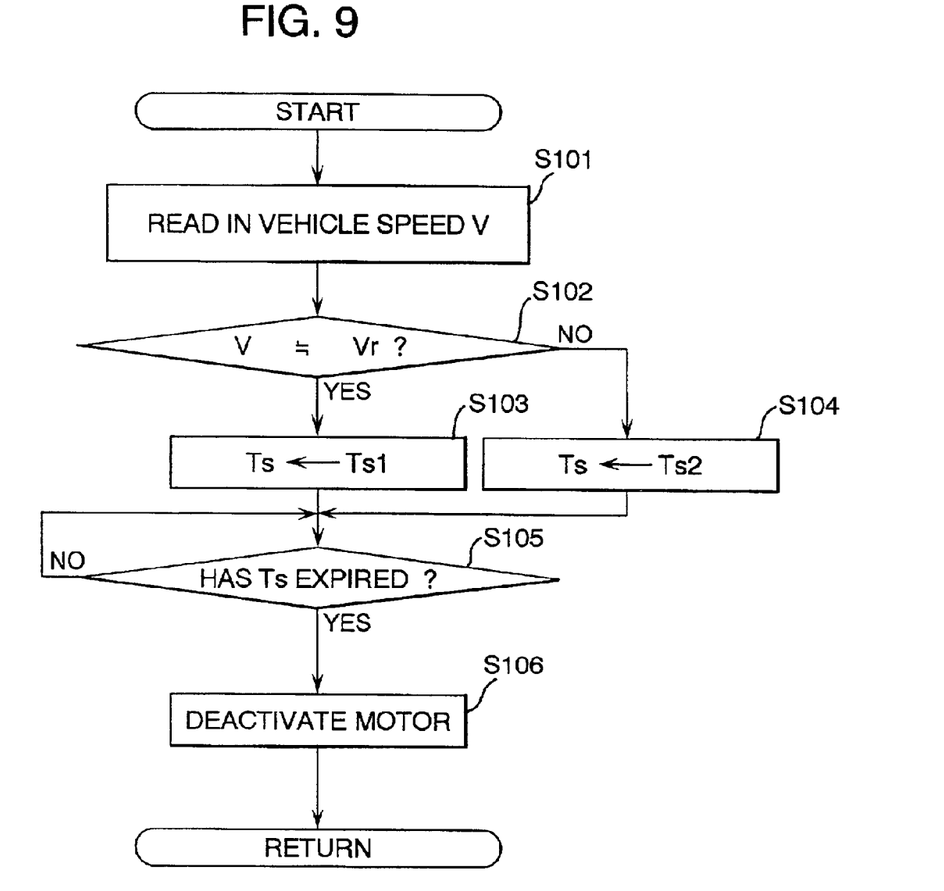
FIG. 9 is a flow chart illustrating a sequence routine of restraining time control for varying a straining time for which a seat belt is strained so as to restrain an occupant's body tightly against the seat back of a seat.

FIG. 9 is a flow chart illustrating a sequence routine of straining time control for varying a straining time Ts for which the seat safety belt 11 remains strained to put an occupant prepared for a crash according to a vehicle speed V when a rear-end collision is predicted. The straining time Ts is defined as a time from activation of the motor 16 to deactivation of the motor 16. This straining time control is performed as a subroutine at step Q8 in the sequence routine illustrated by the flow chart shown in FIG. 4 or at step Q110 in the sequence routine illustrated by the flow chart shown in FIG. 5.

When the sequence logic commences and control proceeds to a function block at step S101 where a vehicle speed V is read in from the speed sensor 23. Subsequently, a judgment is made at step S102 as to whether the vehicle speed V is zero or nearly zero (for example less than 5 km/h). When the answer is affirmative, the straining time Ts is set to a comparatively long straining time Ts1, for example 3 seconds, at step S103. On the other hand, when the answer is negative, the straining time Ts is set to a comparatively short straining time Ts2, for example 1 seconds, at step S104. After setting the straining time Ts to the long straining time Ts1 at step S103 or to the short straining time Ts2 at step S104, a judgment is made at step S105 as to whether the straining time Ts, namely the long straining time Ts1 at step S103 or the short straining time Ts2, from activation of the motor 16 has expired. After waiting expiration of the straining time Ts at step S105, the motor 16 is deactivated.

The deactivation of the motor 16 allows the safety belt 11 to slacken so as to permit the occupant J to move forward his or her upper body for a steering operation or to loosen the safety belt 11 in order to put his or her upper body in an ordinary driving position. As was previously described, while the motor 16 remains activated, the safety belt 11 is strongly strained so as to be prevented from being slackened or pulled out from the pretension unit 12 even with strong pulling force.

When a vehicle speed V is zero or nearly zero, the occupant J is put in a situation where no driving operation of the vehicle 1 is necessary to be done upon an occurrence of a rear-end collision. Accordingly, the predicted rear-end collision adaptive control is performed with the strong intention of protecting the occupant J against injuries by prolonging the straining time Ts. On the other hand, when the vehicle 1 is running at a somewhat high speed, the occupant J is put in a situation where there is a high possibility that the occupant J must actively control the vehicle 1 to avoid involvement in a secondary collision immediately after an occurrence of a rear-end collision. In this situation, the predicted rear-end collision adaptive control is performed with the intention of immediately releasing the occupant J from restraint by shortening the straining time Ts so that the occupant J can be prepared for appropriate driving operations such as steering the vehicle 1 and braking the vehicle 1.

Figure 10:
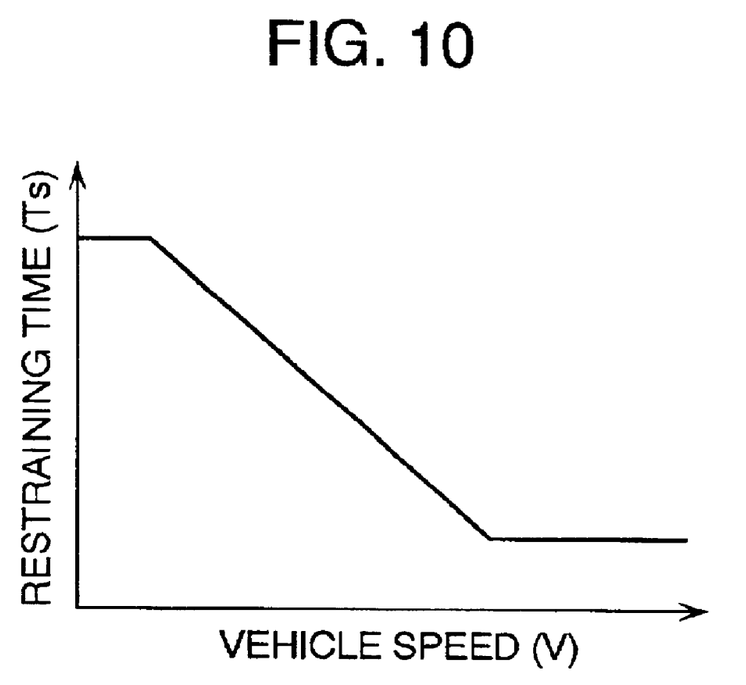
FIG. 10 is a diagram of a restraining time.

In the above embodiment, though the straining time Ts is changed between two different straining times, the straining time Ts may be changed linearly between upper and lower limit times. Specifically, as shown in FIG. 10, the straining time Ts is set to an upper limit straining time, for example, 3 seconds, for a vehicle speed V equal to or near zero and to a lower limit straining time, for example 1 second, for a vehicle speed V higher than a specific speed, for example 40 km/h. The straining time T is changed linearly between these upper and lower limit times when a vehicle speed V is between zero and 40 km/h. Otherwise, the straining time Ts may be changed in multiple steps between these upper and lower limit times according to a vehicle speed V.

Variants and other embodiments are possible. For example, the space distance characteristic curves β1, β2 and β3 may be selected according to both relative approaching speed Vr and head distance Dh. Further, only two or more than three space distance characteristic curves may be prepared. The critical space distance Df may be linearly varied according to both relative approaching speed Vr and head distance Dh by an interpolation method using the space distance characteristic curves β1 β2 and β3. Space distance characteristic curves may be additionally established in addition to the space distance characteristic curves β1, β2 and β3 so that the additional space distance characteristic curves are exclusively used according to running situations. For example, in the case where a space distance characteristic curve β4 is additionally established for a running situation where the vehicle 1 runs on a road having a low road surface friction coefficient μ that corresponds to running situation where the vehicle slow downs with a deceleration of 0.2 G, the space distance characteristic curves β1, β2 and β3 are selectively used according to relative approaching speed Vr and/or head distance Dh when a road surface the vehicle 1 is running is estimated to have a low road load surface friction coefficient μ, and the space distance characteristic curves β2, β3 and β4 are selectively used according to relative approaching speed Vr and/or head distance Dh when a road surface the vehicle 1 is running is estimated to have a high road load surface friction coefficient μ.

In the case where an alarm of a possible rear-end collision is raised at a point of time a specified time before a point of time of a possible occurrence of the rear-end collision as described in Japanese Unexamined Patent Application No. 9-175327 previously mentioned, the specified time may be varied according to, for example relative approaching speed Vr and/or head distance Dh. The alarm means 21 may be desirably of a type that warns the occupant by straining and slacking the safety belt 11, and more desirably of a type that raises an alarm sound because of quick responsiveness.

The occupant protection system of the present invention may be adapted so as to perform either the control of straining the safety belt for putting an occupant prepared for a possible occurrence of a rear-end collision or the control of raising an alarm of a possible rear-end collision alarm control. The predicted rear-end collision adaptive control directly related to the safety belt such as the inhibition control of straining the safety belt and the control of varying the straining time Ts may be performed for the driver's seat only.

The present invention has been described with reference to preferred embodiments thereof. However, it will be appreciated that variants and other embodiments can be effected by person of ordinary skill in the art without departing from the scope of the invention.

What is claimed is:

1. An occupant protection system having a seat equipped with a seat belt system for a vehicle, said occupant protection system comprising:

collision prediction means for predicting a possible occurrence of a rear-end collision of the vehicle with a following vehicle approaching from the rear, and further predicting a possible rear-end collision of the vehicle and raising an alarm of said possible rear-end collision;

collision adaptive control means for straining said seat belt so as thereby to restrain an occupant of said seat tightly against said seat when said collision prediction means predicts said possible occurrence of said rear-end collision;

speed monitoring means for detecting a vehicle speed of said vehicle;

angle monitoring means for detecting a steering angle of said vehicle; and inhibition means for preventing said collision adaptive control means from operating when said vehicle speed and said steering angle are greater than a specified vehicle speed and a specified steering angle, respectively and further preventing said collision prediction means from raising said alarm when said vehicle speed and said steering angle are greater than specified vehicle speed and a specified steering angle, respectively:

wherein said collision adaptive control means changes a straining time for which said collision adaptive control means strains said seat belt.

2. An occupant protection system as defined in claim 1, wherein said collision adaptive control means changes a straining time longer when said vehicle speed is less than nearly zero than when said vehicle speed is greater than nearly zero.

3. An occupant protection system having a seat equipped with a seat belt system for a vehicle, said occupant protection system comprising:

collision prediction means for predicting a possible rear-end collision of the vehicle with a following vehicle approaching from the rear;

alarm means for raising an alarm of said rear-end collision when said collision prediction means predicts said possible rear-end collision;

speed monitoring means for detecting a vehicle speed of said vehicle;

angle monitoring means for detecting a steering angle of said vehicle; and inhibition means for preventing said alarm means from raising an alarm when said vehicle speed and said steering angle are greater than a specified vehicle speed and a specified steering angel, respectively;

wherein said collision adaptive control means changes a straining time for which said collision adaptive control means strains said seat belt.

4. An occupant protection system as defined in claim 3, wherein said collision adaptive control means changes a straining time longer when said vehicle speed is less than nearly zero than when said vehicle speed is greater than nearly zero.

5. An occupant protection system having a seat equipped with a seat belt system for a vehicle, said occupant protection system comprising:

collision prediction means for predicting a possible occurrence of rear-end collision of the vehicle with a following vehicle approaching from the rear and a possible rear-end collision on the basis of a threshold value of a relative attribution of said vehicle with said following vehicle and raising an alarm of said rear-end collision when predicting said possible rear-end collision and changes said threshold value according to a specific condition; and collision adaptive control means for straining said seat belt so as thereby to restrain an occupant of said seat tightly against said seat when said collision prediction means predicts said possible occurrence of rear-end collision; and distance detection means installed in a head restraint of said seat for detecting a head distance of an occupant's head to said head restraint;

wherein said collision prediction means raises an alarm of said rear-end collision when predicting said possible rear-end collision and changes said threshold value according to a specific condition; and wherein said specific condition is said head distance.

6. An occupant protection system having a seat equipped with a seat belt system for a vehicle, said occupant protection system comprising:

collision prediction means for predicting a possible occurrence of rear-end collision of the vehicle with a following vehicle approaching from the rear and a possible rear-end collision on the basis of a threshold value of a relative attribution of said vehicle with said following vehicle and raising an alarm of said rear-end collision when predicting said possible rear-end collision and changes said threshold value according to a specific condition; and collision adaptive control means for straining said seat belt so as thereby to restrain an occupant of said seat tightly against said seat when said collision prediction means predicts said possible occurrence of rear-end collision;

wherein said threshold value is a braking distance which said following vehicle travels before a halt if said following vehicle slows down at a specified deceleration; and wherein said specified deceleration is changed according to said specific condition.

7. An occupant protection system as defined in claim 6, wherein said specific condition is a relative approaching speed between said vehicle and said following vehicle.

8. An occupant protection system as defined in claim 6, and further comprising distance detection means installed in a head restraint of said seat for detecting a head distance of an occupant's head to said head restraint, wherein said specific condition is said head distance.

* * * * *